United States Patent
Lee et al.

(10) Patent No.: US 12,355,524 B2
(45) Date of Patent: Jul. 8, 2025

(54) MULTI-AGENT POLICY MACHINE LEARNING

(71) Applicant: Telefonaktiebolaget LM Ericsson (publ), Stockholm (SE)

(72) Inventors: Heunchul Lee, Täby (SE); Maksym Girnyk, Solna (SE); Jaeseong Jeong, Solna (SE)

(73) Assignee: Telefonaktiebolaget LM Ericsson (Publ), Stockhom (SE)

( * ) Notice: Subject to any disclaimer, the term of this patent is extended or adjusted under 35 U.S.C. 154(b) by 0 days.

(21) Appl. No.: 18/261,928

(22) PCT Filed: Jan. 19, 2021

(86) PCT No.: PCT/SE2021/050027
§ 371 (c)(1),
(2) Date: Jul. 18, 2023

(87) PCT Pub. No.: WO2022/159008
PCT Pub. Date: Jul. 28, 2022

(65) Prior Publication Data
US 2024/0088959 A1   Mar. 14, 2024

(51) Int. Cl.
*H04B 7/06* (2006.01)
*G06N 3/08* (2023.01)

(52) U.S. Cl.
CPC ............. *H04B 7/0617* (2013.01); *G06N 3/08* (2013.01); *H04B 7/0619* (2013.01)

(58) Field of Classification Search
CPC ...... H04B 7/0617; H04B 7/0619; G06N 3/08; G06N 3/045; G06N 3/006

USPC ................................................. 375/267, 299
See application file for complete search history.

(56) References Cited

U.S. PATENT DOCUMENTS

| | | | |
|---|---|---|---|
| 2005/0195907 A1 | 9/2005 | Jain | |
| 2021/0191495 A1* | 6/2021 | Dasilva | G06N 3/04 |
| 2023/0344725 A1* | 10/2023 | Wang | H04W 24/02 |
| 2024/0039799 A1* | 2/2024 | Parichehrehteroujeni | H04B 17/3913 |
| 2024/0179636 A1* | 5/2024 | Pezeshki | H04W 72/20 |

FOREIGN PATENT DOCUMENTS

EP     1976140 A1    10/2008

OTHER PUBLICATIONS

International Search Report and Written Opinion dated Oct. 6, 2021 for International Application No. PCT/SE2021/050027 filed Jan. 19, 2021, consisting of 9-pages.

(Continued)

*Primary Examiner* — Emmanuel Bayard
(74) *Attorney, Agent, or Firm* — Weisberg I.P. Law, P.A.

(57) ABSTRACT

There is disclosed a method of operating a beam-forming wireless communication system, the system has a plurality of radio nodes, an actor neural network being associated to each radio node, wherein further to each actor neural network, there is associated a critic network. The method includes training each actor neural network, for controlling at least one associated radio node, based on learning feedback provided by its associated critic network, the learning feedback being based on operation information provided be the actor neural network for the critic network. The disclosure also pertains to related devices and methods.

20 Claims, 4 Drawing Sheets

(56) References Cited

OTHER PUBLICATIONS

F. Fredj et al.; Distributed Uplink Beamforming in Cell-Free Networks Using Deep Reinforcement Learning; ArXiv; Jun. 26, 2020, consisting of 26-pages.
C. Huang et al.; Reconfigurable Intelligent Surface Assisted Multiuser MISO Systems Exploiting Deep Reinforcement Learning; IEEE Journal on Selected Areas in Communications, vol. 38, No. 8; Aug. 2020, consisting of 12-pages.
M. Sadek et al.; A Leakage-Based Precoding Scheme for Downlink Multi-User MIMO Channels; IEEE Transactions on Wireless Communications, vol. 6, No. 5; May 2007, consisting of 11-pages.
R. Lowe et al.; Multi-Agent Actor-Critic for Mixed Cooperative-Competitive Environments; ArXiv; Mar. 14, 2020, consisting of 16-pages.

* cited by examiner

Fig. 3
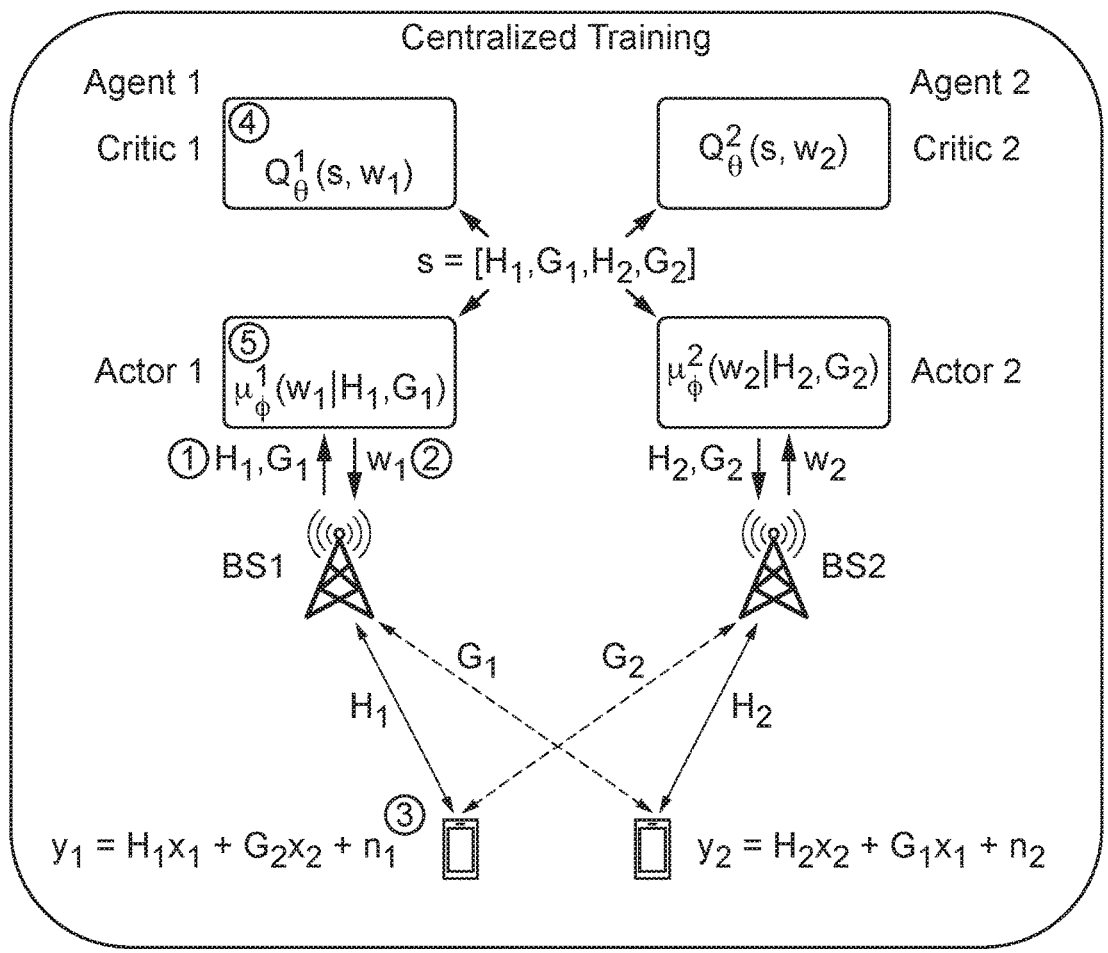
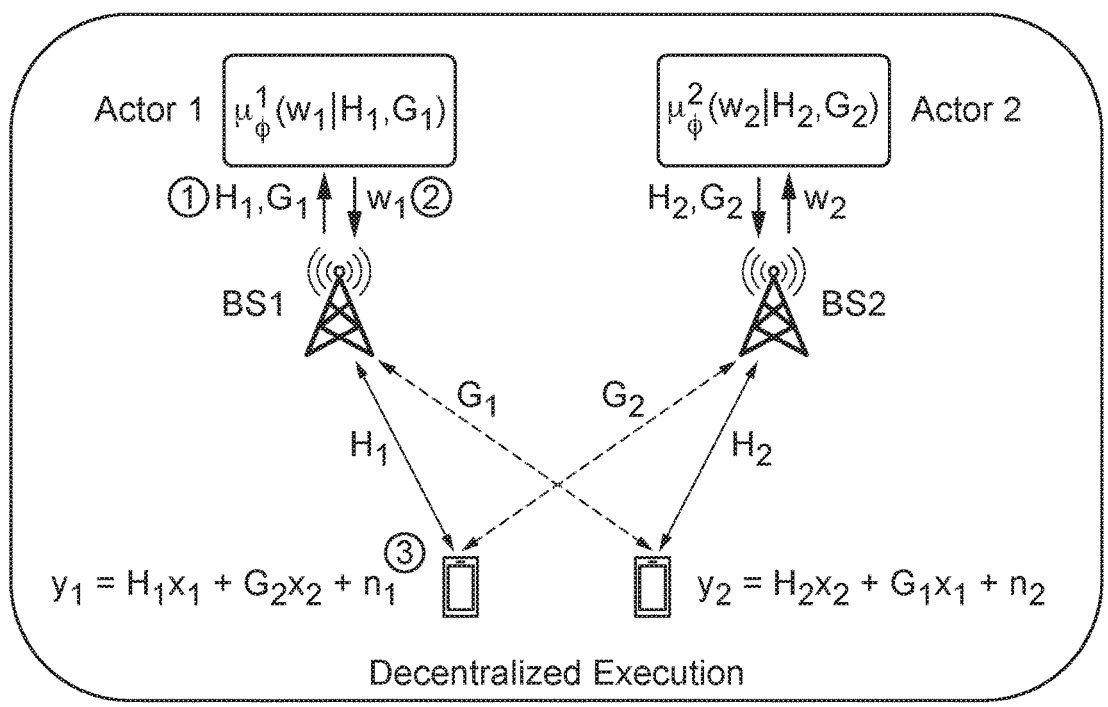

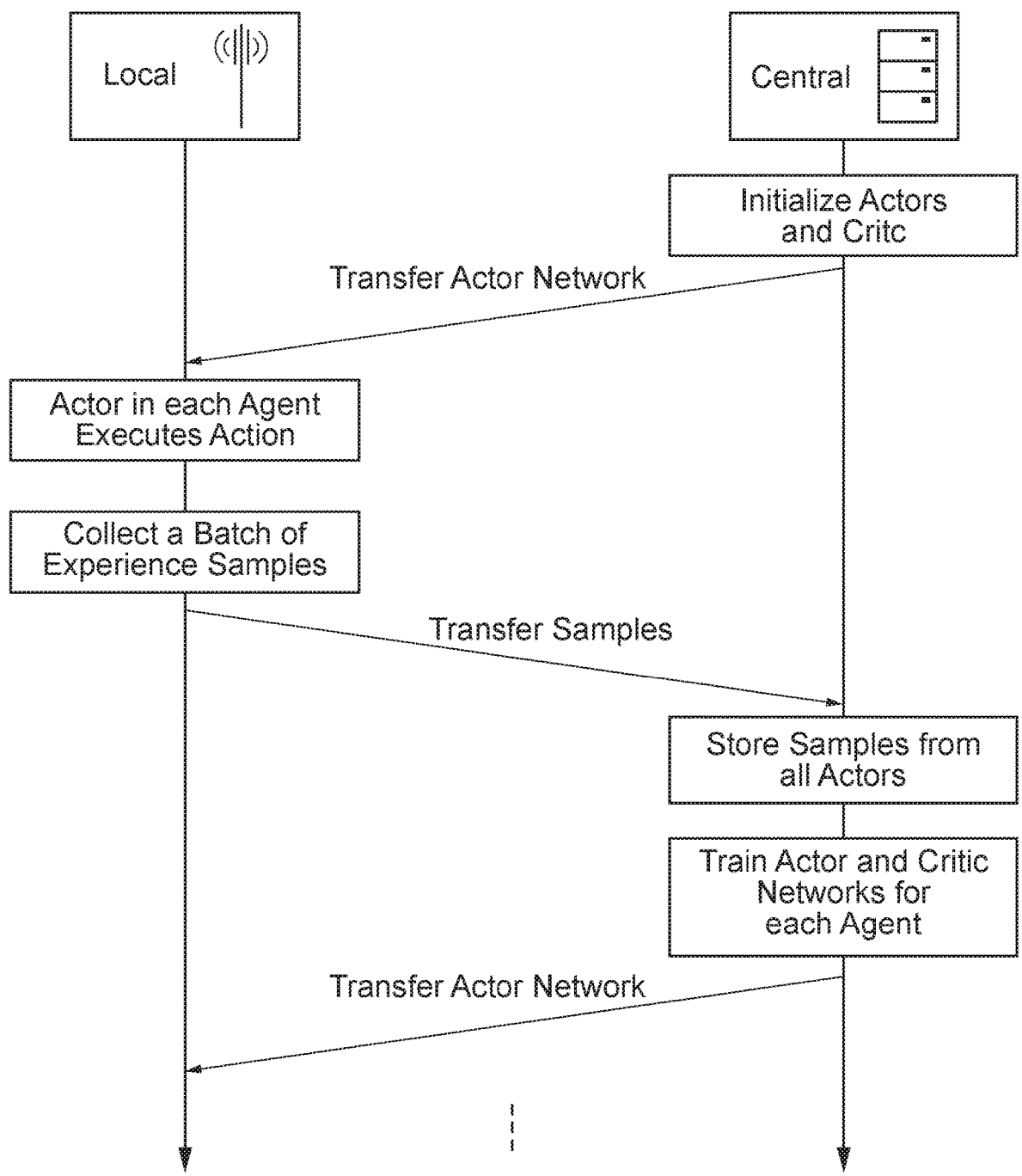

MULTI-AGENT POLICY MACHINE LEARNING

CROSS-REFERENCE TO RELATED APPLICATION

This application is a Submission Under 35 U.S.C. § 371 for U.S. National Stage Patent Application of International Application Number: PCT/SE2021/050027, filed Jan. 19, 2021 entitled "MULTI-AGENT POLICY MACHINE LEARNING," the entirety of which is incorporated herein by reference.

TECHNICAL FIELD

This disclosure pertains to multi-agent systems, in particular for controlling and/or monitoring wireless communication networks.

BACKGROUND

The area of cellular communications is undergoing an explosive development, penetrating ever wider segments of society and industry. Next-generation wireless communication networks will be addressing a number of new use cases. Apart from expected enhancements in mobile broadband—this time driven by emerging extended reality (XR) applications—new services, such as, e.g., ultra-reliable low-latency and massive machine-type communications pose a number of rather challenging requirements on future communication networks, starting from higher data rates, lower latency to higher energy efficiency and lower operational and capital expenditures. Consequently, such networks are expected to be rather complex and difficult to model, analyze and manage in traditional ways.

Moreover, as an explicit trend of densification is observed, more complex operation regimes and environments are anticipated.

SUMMARY

It is an object of this disclosure to provide approaches facilitating improved handling of multi-agent system, in particular in the context of machine-learning.

There is disclosed a method of operating a beam-forming wireless communication system. The system comprises a plurality of radio nodes. An actor neural network is associated to each radio node. Further, to each actor neural network, there is associated a critic network. The method comprises training each actor neural network, for controlling at least one associated radio node. The training for an actor neural network is based on learning feedback provided by its associated critic network, the learning feedback being based on operation information provided by the actor neural network and/or the radio node associated thereto for the critic network.

Moreover, a beam-forming wireless communication system is described. The system comprises a plurality of radio nodes. An actor neural network (ANN) is associated to each radio node. Further, to each actor neural network, there is associated a critic network. The system is adapted for training each actor neural network; the training is for controlling at least one associated radio node. The training for an actor neural network is based on learning feedback provided by its associated critic network. The learning feedback is based on operation information provided by the actor neural network and/or the radio node associated thereto for the critic network.

A method of operating an actor neural network for a wireless communication system is discussed. The actor neural network is associated to at least one radio node. To the actor neural network, there is associated a critic network. The method comprises training the actor neural network for controlling the at least one associated radio node. The training is based on learning feedback provided by its associated critic network, the learning feedback being based on operation information provided by the actor neural network and/or the radio node associated thereto for the critic network.

There is also considered an actor neural network for a wireless communication system. The actor neural network is associated to at least one radio node. To the actor neural network, there is associated a critic network. The actor neural network is trained, for controlling the at least one associated radio node, based on learning feedback provided by its associated critic network. The learning feedback is based on operation information provided by the actor neural network and/or the radio node associated thereto for the critic network.

The approaches described herein allow efficient training of actor neural networks, in which incomplete information available for one actor neural network may be compensated for by the critic network/s. Thus, an actor neural network may be trained considering operation information of other actor neural networks or radio nodes, which may be unknown to the trained actor neural network.

In general, a critic network (or each of the critic networks) may receive operation information from a plurality of the actor neural networks. The plurality may comprise actor neural networks (ANN) not receiving learning feedback from the critic network and/or not trained by the critic network and/or not associated to the critic network and/or associated to another critic network. In some cases, the plurality of ANNs may represent the ANNs associated to the plurality of radio nodes, or to a subset thereof. The learning feedback for one ANN may be based on, and/or be determined based on, operation information from the plurality of ANNs. It may be considered that the learning feedback is representative of, and/or based on, machine learning performed by the critic network and/or provided by the critic network to the ANN. A critic network may be a critic neural network, e.g. for machine learning and/or artificial intelligence. The critic network may determine the learning feedback for an ANN and/or radio node and/or agent based on operating the ANN, e.g. a copy thereof. The copy may correspond to the state of the ANN used for operating the radio node as represented by the operation information, in particular activity information. The critic network may be a neural network adapted for monitoring and/or evaluating and/or performing reinforcement learning on one or more ANNs.

Operation information from one or more ANNs may represent training data for a critic network. For an ANN, the learning feedback and/or operation information, and/or local (e.g., performed by the associated radio node/s) measurements, and/or activity information, and/or radio environment information may be considered training data. The learning feedback may represent reward information, e.g. for and/or from reward-based learning, and/or control information and/or parameters for operating the ANN and/or associated radio node. In some cases, the learning feedback may represent and/or determine a new learning or operating state of the ANN and/or a trained and/or updated ANN. It should be noted that the training may be before actual operation of the network/s, and/or be performed while operating the network, e.g. to provide radio access for users. The terms training and learning may be considered to be essentially exchangeable, at least from the point of view of a network being trained. In general, reward-based learning may also be referred to a reinforcement learning. The approaches described herein may comprise multiple loops of controlling radio nodes and/or providing operation information and/or receiving learning feedback.

A neural network associated to another neural network may be connected or connectable to the other network for communicating and/or exchanging information and/or feedback, e.g. operation information and/or learning feedback. The connection may be cable-bound, and/or wirelessly, e.g. via a radio access network or a backhaul network, in particular an IAB network. A network associated to a radio node may be a network connected or connectable to, and/or implemented as part of, the radio node, e.g. to control the radio node and/or to receive information from it, in particular operation information. It may be considered that a neural network like a ANN or critic network is implemented as and/or comprises firmware and/or software and/or hardware and/or data, e.g. training data and/or operation data. Hardware may in particular comprise processing circuitry and/or communication circuitry; the neural network, and/or software or firmware components thereof, may adapted to be operating or operable running on the processing circuitry, and/or to use the communication circuitry for communicating with connected or connectable network/s and/or device/s. An actor neural network may in general be a neural network adapted for controlling the associated radio node/s, e.g. in terms of beamforming to be used for communicating (e.g., receiving and/or transmission), and/or for scheduling and/or other operation. The actor neural network may in particular be adapted for determining precoders and/or precoding and/or for link adaption (e.g., determining MCS) for transmission of signaling and/or reception of signaling. An ANN implemented and/or connected or connectable to be operational to control a radio node may be considered an agent.

It maybe considered that the operation information may comprise radio environment information and/or experiences. The radio environment information and/or experience may represent channel estimates and/or measurements and/or signal quality and/or signal strength and/or data throughput and/or interference and/or signaling characteristics, in particular beam signaling characteristics, e.g. pertaining to one or more beams (in particular, reception beams and/or transmission beams for a radio node). Information pertaining to transmission beams may be provided to a radio node based on feedback received from other radio nodes or devices, e.g. wireless devices connected to a radio node. Radio environment information may be provided to the ANN, e.g. based on measurements performed by, and/or information determined or obtained by, the associated radio node/s. Radio environment information may pertain to one or more carriers, and/or parts thereof, e.g. bandwidth parts. It may be considered that the radio environment information and/or experiences are determined after and/or during a radio node is or has been controlled for operation by an agent or ANN, e.g. corresponding to some activity information. Thus, radio environment information may be in reaction to activity represented or representable by activity information.

The beamforming system may be considered a MIMO system, e.g. allowing multiple users to be connected, and/or multiple beams to be transmitted and/or received simultaneously. Beamforming may be performed based on one or more precoder/s. In particular, beamforming may be non-codebook based (without fixed and/or predefined and/or configured precoder/s); however, codebook based beamforming may be considered, in which configured and/or configurable beams from a set of beams may be used, and/or communication partners may agree on a set of precoders and/or beams, e.g. transmission beams.

The radio nodes may in particular be and/or comprise network radio nodes, e.g. base stations and/or IAB nodes and/or relay nodes. However, in some cases, the radio nodes may comprise one or more wireless devices like terminals and/or UEs. Information provided by a radio node for a critic network may be provided via one or more layers of communication and/or protocols and/or processing steps; these may include an agent or ANN, but in some cases may circumvent the agent or ANN. For example, radio environment information may be provided directly to a critic network.

It may be considered that the operation information may comprises activity information. Activity information may comprise information representing activity performed by an agent and/or ANN, in particular controlling one or more radio nodes associated thereto. Activity information may for example represent and/or indicate one or more precoders, and/or beamforming parameters used for beamforming, e.g. representing beamforming weights and/or phase shifts and/or antenna port/s and/or transmission power (note that transmission power for a received beam may be represented by, and/or determined based on a path loss), and/or duration and/or beam sweeping characteristics and/or beam angular extension and/or lobes and/or polarisation and/or which antenna/s or antenna arrays have been or are used. Alternatively, or additionally, the activity information may comprise information regarding scheduled and/or actually transmitted and/or received signaling, in particular signaling carried on the beam/s, e.g. signaling characteristics and/or channel information (e.g., whether and/or which data channel and/or control channel is used) and/or the modulation and/or coding scheme, and/or code rate, and/or transmission format. The activity information may be associated to radio environment information, which may also be included in the operation information: The radio environment information may represent a time after and/or during the activity (e.g., one or more points in time). In some cases, a time before the activity may be included, e.g. as a reference.

Operation information provided by different actor neural networks may comprise radio environment information pertaining to different parts of the radio environment, e.g. geographically different (e.g., due to different locations) and/or different section or cells. Thus, the learning and/or training may consider larger scales or areas than observable by one radio node or ANN.

It may be considered that operation information may comprise radio environment information. Radio environment information may be represented and/or representable by channel matrix information, e.g. indicating channel conditions and/or channel estimations, pertaining to one or more radio channels and/or beams and/or types of signaling as seen and/or determined and/or obtained by a radio node and/or its associated ANN.

In some variants, learning feedback may be based on, and/or represent, reward learning. The critic network may learn based on reward learning, and/or may provide the learning feedback based on such learning. Reward learning may reward desired or more desirable solutions with a reward signal (or deny such for undesirable solutions). The reward signal may be based on achieving a target set of conditions, e.g. pertaining to a plurality of radio nodes and/or ANNs, with activity information and/or associated radio environment information. Providing a reward signal to an ANN as training data or learning feedback may allow low signaling overhead.

It may be considered that a critic network is associated to a plurality of actor neural networks, e.g., to all of the ANNs, or to a subset. There may be one critic network, allowing centralised learning for all ANNs. In some cases, there may be more than one critic network, which may be adapted to communicate with each other or not; in this case, learning for multiple ANNs may be combined (in particular, the operation information may be combined for learning). There may be one critic network for each ANN, or one critic network for a plurality of ANNs.

In some variants, the operation information may be provided via a backhaul link (which may be wireless) and/or a cable connection. This may allow large data transfer rates; interference with a radio access network may be limited.

There is also considered a wireless communication system comprising one or more actor neural networks trained and/or being trained as described herein; the system may comprise one or more radio nodes and/or critic networks. The wireless communication system may provide radio access and/or IAB functionality.

A network node for a wireless communication network is described. The network node may be a radio node, and/or may be controlled or controllable by an actor neural network trained or being trained as described herein.

There is also described a program product comprising instructions causing processing circuitry to control and/or perform a method as described herein. Moreover, a carrier medium arrangement carrying and/or storing a program product as described herein is considered. An information system comprising, and/or connected or connectable, to a radio node is also disclosed.

BRIEF DESCRIPTION OF THE DRAWINGS

The drawings are provided to illustrate concepts and approaches described herein, and are not intended to limit their scope. The drawings comprise:

FIG. 3, showing an exemplary learning procedure; and

FIG. 4, showing another exemplary (e.g., signaling) radio node.

DETAILED DESCRIPTION

Figure 1:
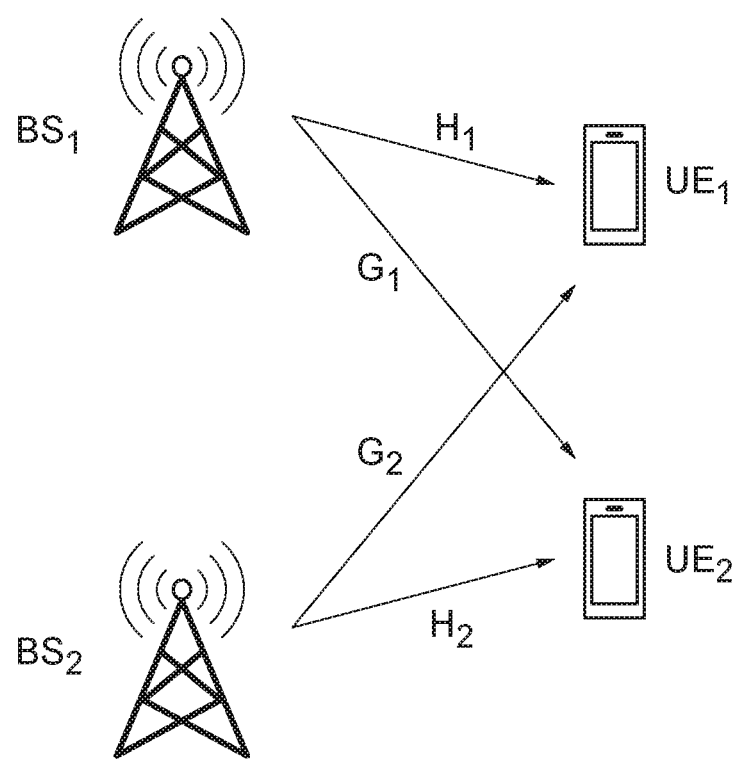
FIG. 1, showing an exemplary scenario for wireless communication.

There is proposed a multi-agent deep reinforcement learning-based precoding framework that can be used to learn an optimal precoding policy in challenging multi-user multi-cell MIMO environments.

Orthogonal frequency division multiplexing (OFDM) modulation has been widely used on modern communication systems, allowing the partition of the total available bandwidth into a number of equally spaced subcarriers, and facilitating turning a frequency-selective multiple-input multiple-output (MIMO) channel into a set of frequency-flat frequency-time resource elements (REs). An optimal precoding scheme would involve designing the best possible channel-dependent precoder on a per-RE basis. However, this approach is not practical due to issues with channel estimation and hardware implementation that arise on such a fine granularity. Instead, in a practical MIMO-OFDM system, a precoder may be chosen on per-subband basis and may be based on the spatial channel covariance matrix of the channel averaged over the pilot signals (reference signaling) in a given subband as measured. The precoder may be represented and/or indicated by learning feedback and/or activity information; the spatial channel covariance matrix may be based on, and/or represent, radio environment information.

In practical deployments, the problem is additionally complicated by issues related to multi-cell multi-user operation. For example, when multiple entities (like base stations, and/or wireless devices or UEs) operate in close proximity, they interact with each other, e.g., producing dynamic interference towards each other. This may lead for example to non-stationarity of the environment and/or partial observability, which may not be possible to solve with state-of-the art methods. The former issue may result in interdependence of optimal policies of the agents among each other. The latter issue may lead to absence of full information about the joint state of the system across the operating agents. Hence, the agents' decisions may become sub-optimal at each time step, making it even harder to arrive at the optimal time-dependent policy.

To address the operation, e.g. the precoding problem, in particular in a multi-cell multi-user MIMO environment, there is proposed utilising reinforcement learning (also referred to as reward learning) for multiple agents in a system to learn their optimal operation policies (e.g., precoding policies and/or which precoders to use in which radio environment) from interactions (or experiences) with real-world MIMO deployments, in particular in a non-codebook based precoding mode. Explicitly learning the underlying model of the whole MIMO system and channels may be omitted. A framework of a centralized-learning with decentralized execution may be considered.

Proposed approaches adapt the learning of an optimal or optimised policy to the realistic multi-cell multi-user setting. The approaches may provide centralized learning with decentralized execution (e.g., local execution after transfer). In this way, equipped with a better knowledge of the environment-to-policy mapping, each agent can execute more efficiently and agilely only with its local observations in the execution phase. The approaches may achieve latency reduction in each agent's decision making process, as it does not need information exchange between agents over the network during a decision making process and/or after training.

MIMO and/or beamforming and/or using precoding for transmissions (and/or reception) may be a key technology in future wireless networks. The use of multiple antennas at both transmitter and receiver in wireless communication links provides a means of achieving higher data rate and/or lower bit error rate (BER). Use of beamforming systems or MIMO systems may for example be realized by utilizing channel state information (CSI) and/or other information regarding beam signaling characteristics in the precoding design at the transmitter. Two precoding modes may be provided, namely codebook-based and non-codebook-based precoding. In the codebook-based mode, a pre-defined codebook is given by a finite set of precoders, which may be shared between the transmitter and receiver. The receiver may choose, e.g. based on CSI-RS signaling received, an index of the best precoder in the codebook (used for transmitting the CSI-RS, e.g. in one or more reference beams), which it may feed back to the transmitter, e.g. in the form of a measurement report (e.g., CSI control information). Precoding operation based on the pre-defined codebook may lead to performance loss due to low flexibility. Meanwhile, a non-codebook based precoding mode may operate in a continuous space of possible precoders (or at near continuous space, e.g. depending on parametrisation resolution), e.g. trying to match the precoder to the actual channel realization. In this mode, the CSI is usually acquired from channel reciprocity, and the precoder may be computed based on the acquired CSI at the transmitter, while the receiver is not aware of the transmitter's precoder. A first network node or transmitter selecting or determining a precoder may receive reference signaling from a second node or receiver; based on the received reference signaling, the precoder may be selected, e.g. for transmission to the second network node, and/or for reception (using transmission beamforming and/or reception beamforming). Precoding may be generally be used for beamforming; a precoder may define one beam, or multiple beams, e.g. over time and/or in multiple directions, e.g. using digital beamforming, or multiple analog beams.

FIG. 1 shows an exemplary scenario for wireless communication in a multiple connection system with two exemplary users. A first base station BS1 may be set up to communicate with a first user equipment UE1 via connection H1 and with a second user equipment U2 via connection G1. A second base station BS2 may be set up to communicate with UE1 via connection G2 and with UE2 via connection H2. Each connection may represent and/or comprise at least a beam and/or beam pair and/or cell. The system may be considered a MIMO system. Learning agents may sequentially choose the individual precoders (e.g., for beams of the connections) to serve the environment of interference MIMO channel based on environment conditions, while simultaneously adapting the precoder policy based on a reward feedback from, or pertaining to, the environment to maximize a numerical reward signal. To each base station, there may be associated one or more agents, which can be subject to such reward-based learning.

Figure 2:
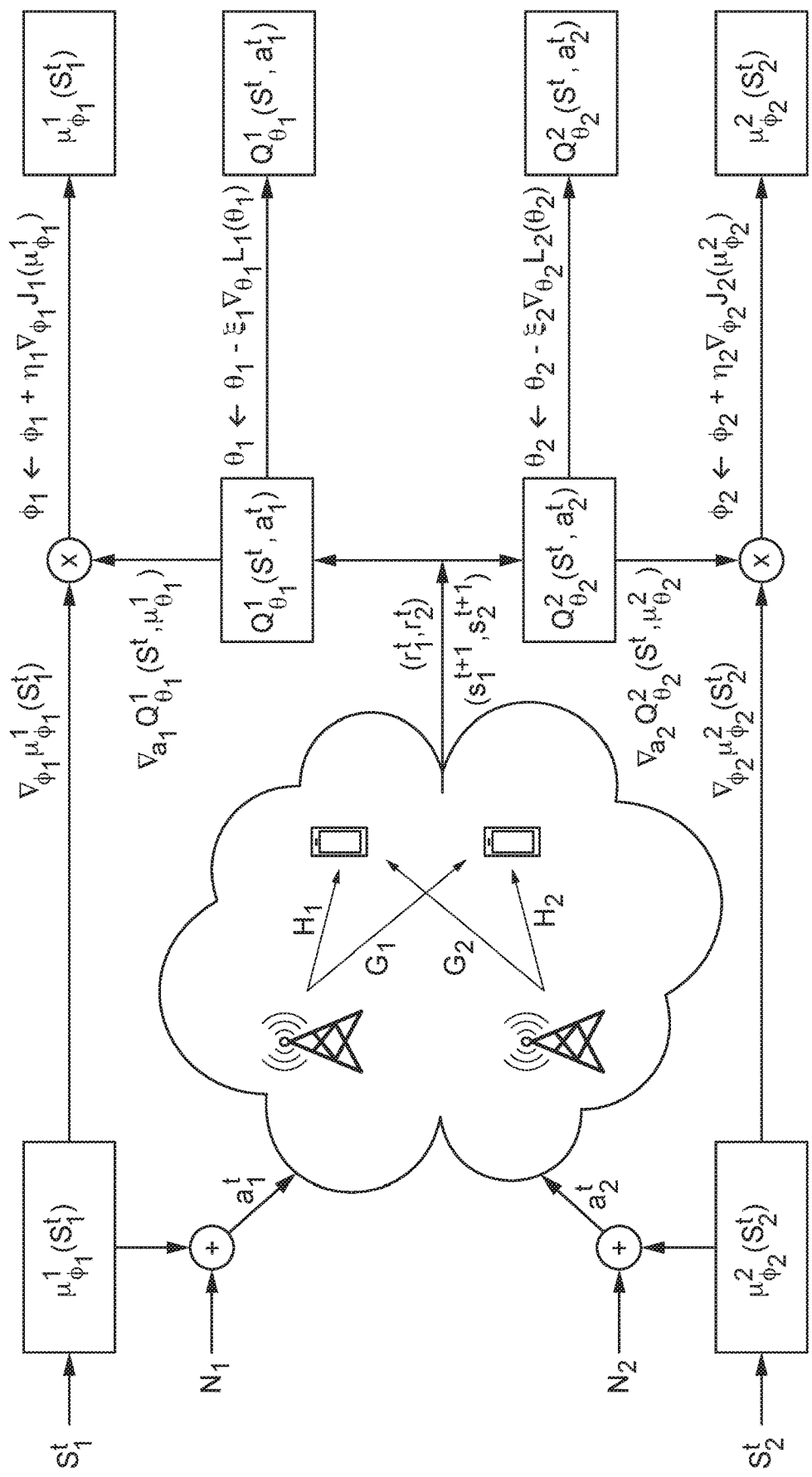
FIG. 2, showing an exemplary beamforming system.

FIG. 2 shows an exemplary beamforming system. In particular, there is shown a block diagram of an exemplary beamforming system, in this case a MIMO-OFDM system equipped with $n_{tx}$ transmit and $n_r$ receive antennas. A precoding vector $w \in \mathbb{C}^{n_{tx} \times 1}$ at the transmitter and a combining vector $r \in \mathbb{C}^{n_{rx} \times 1}$ at the receiver are applied for exploiting the spatial diversity available in MIMO systems. At the transmitter, one transport bit stream is encoded to a bit block $b_{tx}$ which is then symbol-mapped to modulation symbols x. Typical modulation constellations used are M-QAM, consisting of a set of M constellation points. Then, the data symbols x are precoded by the precoding vector w to form $n_{tx}$ data substreams, e.g. using different antenna subsystems. Finally, the streams are transmitted via the available multiple transmit antennas.

The set of data REs in a given subband may be denoted by $\Phi_d$. Considering a subband precoding application of a precoder w to the data REs $i \in \Phi_d$, $x_i$ may denote the complex data symbol at the RE and $y_i \in \mathbb{C}^{n_{rx} \times 1}$ may denote the complex received signal vector at the RE. Then the received signal at the RE i can be written as $$y_{n,i} = H_{n,i} w_n x_{n,i} + G_{n,i} w_m x_{m,i} + n_{n,i}, \quad \text{Equation 1}$$

where $H_{n,i} \in \mathbb{C}^{n_{rx} \times n_{tx}}$ represents the MIMO channel matrix between transmit and receive antennas in cell n at RE i, $G \in \mathbb{C}^{n_{rx} \times n_{tx}}$ represents the MIMO interference matrix coming from cell m at RE i, and $n_i \in \mathbb{C}^{n_{rx} \times 1}$ is an additive white Gaussian noise (AWGN) vector whose elements are i.i.d. complex-valued Gaussians with zero mean and variance $\sigma_n^2$. Without loss of generality, the data symbol $x_{n,i}$ and the precoding vector $w_{n,i}$ of the transmitter in cell n may be normalized so that $E[|x_{n,i}|^2]=1$ and $\|w_n\|^2=1$, where $|\cdot|$ denotes the absolute value of a complex value and $\|\cdot\|$ denotes the 2-norm of a vector. Also, without loss of generality, the same may hold for the signal from cell m. Hence, the SNRs are given by $1/\sigma_n^2$. At the receiver, the transmitted data symbol $x_{n,i}$ can be recovered by combining the received symbols $y_{n,i}$ by the unit-norm vector $r_{n,i}$ (i.e., $\|r_{n,i}\|^2=1$), which yields the estimated complex symbol $z_i$ $$z_{n,i} = r_{n,i}^\dagger y_{n,i} = r_{n,i}^\dagger H_{n,i} w_n x_{n,i} + r_{n,i}^\dagger G_{n,i} w_m x_{m,i} + r_{n,i}^\dagger n_{n,i}, \quad \text{Equation 2}$$

where $(\cdot)^\dagger$ denotes the complex conjugate of a vector or matrix.

Note that $r_{n,i}^\dagger H_{n,i} w_n$ in Equation (2) corresponds to the effective channel gain. A maximal ratio combiner (MRC) may be used at the receiver, which is optimal in the sense of output SNR maximization when the noise is white.

An optimal or optimised precoding solution may be given by a channel-dependent precoder on a per-RE basis. In other words, an optimal precoder $H_{n,i}$ may be chosen that maximizes the effective channel gain $r_{n,i}^\dagger H_{n,i} w_{n,i}$ on a per-RB or per-RE basis. However, in practical MIMO-OFDM systems, a precoder may be chosen on per-subband basis, achieving a tradeoff between performance and complexity. A practical subband-precoding solution may be obtained based on a spatial channel covariance matrix averaged over the pilot signals (or reference signals) in a given subband. The set of pilot REs (e.g., REs carrying pilot/reference signals) in a given subband may be referred to by $\Phi_p$. The channel covariance matrix in cell n is given by $$R_{hh} = \frac{1}{|\Phi_p|} \sum_{j \in \Phi_p} H_{n,j}^\dagger H_{n,j}. \quad \text{Equation 3}$$

In the multi-user setting, a solution based on a beamforming scheme for maximizing the signal-to-leakage-plus-noise ratio (SLNR) may be desirable. However, in the given setting, both solutions remain sub-optimal, and furthermore, no truly optimal solution has been found for this setting to date. A (machine-) learning approach is considered as an alternative. The proposed solution learns an optimised or optimal precoding policy directly from interactions with complex real-world MIMO environments, e.g. represented as radio environment information representing reaction to activity (e.g., transmissions and/or reception controlled by an agent or ANN) represented or representable as activity information.

FIG. 3 illustrates an exemplary basic learning procedure where an agent observes a partial channel state of environment conditions and chooses a precoder $w_t = a_i^t$ to serve the environment. After each time step t, the agent receives a feedback of the performance, e.g., throughput or BER, in return for the action taken. Over the times $t=0, 1, \ldots$, the agent learns about how the partial channel states $s_i^t$ and precoders $w^t$ relate to each other so that the agent can predict the best precoder by observing the new state at next steps. The environmental state can be any (radio) environmental information that can help the agent learn the optimal policy. In the exemplary setting, the environmental state is represented by channel matrices on the pilot REs in a given subband; the partial channel state $s_i^t$ can be defined by a set of vectorized channel matrices as follows:

$$s_i^t = \{[vec(\text{Re}[H_j])^T, \quad \text{Equation 4}$$
$$vec(\text{Im}[H_j])^T,$$
$$vec(\text{Re}[G_j])^T,$$
$$vec(\text{Im}[G_j])^T]\}_{j \in \phi_p},$$

where Re[•] and Im[•] generally represent the real and imaginary parts of a complex valued channel matrix.

The learning agent chooses a precoder $w^t$ in the state $s_i^t$, e.g. according to a policy, and the chosen action is applied to the MIMO-OFDM system to get a certain bitrate given by $$r_i = \log\left(1 + \frac{|H_i w_i|^2}{\sum_{\substack{j=1 \\ j \neq 1}}^{N} \sigma_n^2 + |G_j w_j|^2}\right), \quad \text{Equation 5}$$

For the multi-agent system with N agents, the proposed learning method consists of a set of neural networks:
- one set of actor networks (each actor network may represent one agent, e.g. as neural network and/or learning network), denoted by $(\mu_{\varphi_1}^1, \mu_{\varphi_2}^2, \ldots, \mu_{\varphi_N}^N)$, with parameters $(\varphi_1, \varphi_2, \ldots, \varphi_n)$ may estimate the optimal precoding policies that map from channel states $s_1, s_2, \ldots, s_N$ to precoders $a_1, a_2, \ldots, a_N$, e.g. analogous to the agent described above;
- one set of critic networks (of one or more critic networks; each critic network may represent one neural and/or learning network, e.g. as critic agent), denoted by $(Q_{\theta_1}^1, Q_{\theta_2}^2, \ldots, Q_{\theta_N}^N)$, with parameters $(\theta_1, \theta_2, \ldots, \theta_N)$ estimate the values of precoder $a_1, a_2, \ldots, a_N$ in channel state $s=[s_1, s_2, \ldots, s_N]$.

FIG. 3 illustrates the networks of the proposed method for a two-agent scenario. For each cell $i \in [1, \ldots, N]$, the actor network $\mu_{\varphi_i}^i(s_i)$ takes state $s_i$ as input and provides a precoder $a_i = \mu_{\varphi_i}^i(s_i)$ in multi-dimensional (e.g., continuous) precoder space, and the critic network $Q_{\theta_i}^i(s, a_i)$ takes not only state $s = [s_1, s_2, \ldots, s_N]$ a, but also action $a_i$ as input and provides an output value $q_i = Q_{\theta_i}^i(s, a_i)$.

Through the experiences $[s^t, a_i^t, r_i^t] = [[H_i^t, G_i^t]_1^N, w_i^t, c_i^t]$, the critic network $Q_{\theta_i}^i(s, a_i)$ is trained by the Q-learning algorithm, estimating the target value as $$Y_{\theta_i}^t = r_i^t + \gamma_i Q_{\theta_i}^i(s_i^{t+1}, \mu_{\varphi_i}^i(s_i^{t+1})). \quad \text{Equation 6}$$

Then, defining a loss function as $$L_i(\theta_i) = \frac{1}{2}|Y_{\theta_i}^t - Q_{\theta_i}^i(s_i^t, \mu_{\phi_i}^i(s_i^t))|^2, \quad \text{Equation 7}$$

The parameters $\theta_i$ are updated as $$\theta_i \leftarrow \theta_i + \xi_i \nabla_{\theta_i} L_i(\theta_i), \quad \text{Equation 8}$$

where $\xi_i$ is a learning rate, and $\nabla_{\theta_i} L_i(\theta_i)$, is the gradient of the loss function w.r.t the critic network parameters $\theta_i$. Meanwhile, the actor network $\mu_{\varphi_i}^i(s_i)$ is trained by the following parameter update rule:

$$\phi_i \leftarrow \phi_i + \eta_i \nabla_{\phi_i} \mu_{\phi_i}^i(s_i) \nabla_{a_i} Q_{\theta_i}^i(s, a_i)\big|_{s_i = s_i^t, a_i = \mu_{\phi_i}^i(s_i^t)} \quad \text{Equation 9}$$

where $\eta_i$ is a learning rate, $\nabla_{\varphi_i} \mu_{\varphi_i}^i(s_i)$ is the gradient of $\mu_{\varphi_i}^i(s_i)$ with respect to $\varphi_i$, and $\nabla_{a_i} Q_{\theta_i}^i(s, a_i)$ is the gradient of $Q_{\theta_i}^i(s, a_i)$ with respect to the action $a_i$, which is also illustrated in FIG. 3.

During the training phase, the actor network $\mu_{\varphi_i}^i(s_i)$ is used to select a precoder in such a way that different actions are explored for a same state s (within one state, parameter values may lie within a range; and/or parameter values of the same state do not have to be identical). In one example, the deterministic precoder by $\mu_{\varphi_i}^i$, is perturbed by adding noise vector $\mathcal{N}_i$, which may be sampled from a Gaussian random process as follows:

$$a_i = \mu_{\varphi_i}^i(s_i) + \mathcal{N}_i \quad \text{Equation 10}$$

In other example, it may be considered adding a random parameter noise to the parameters of the first neural network, i.e., $$a_i = \mu_{\phi_i + \mathcal{N}_i}(s_i)$$

A pseudo-code of the proposed learning procedure is presented in Error! Reference source not found. below. The solution is based on a multi-agent DDPG (MA-DDPG) algorithm.

---

MA-DDPG algorithm for N agents
Initialize actor networks $\mu_{\phi_i}^i(s_i)$ and critic networks $Q_{\theta_i}^i(s, a_i)$ with random parameters $\phi_i$ and $\theta_i$ using, e.g., Xavier rule
for episode e = 1: E do
    For each agent i, initialize the initial states $s_i^0$, e.g., according to the channel model
    for time step t = 0: T − 1 do
        For each agent i, choose action with added exploration noise
        $a_i = \mu_{\theta_i}^i(s_i^t) + \mathcal{N}_i$
        Execute actions $a_i$ and observe rewards $r_i$, e.g., as in equation 5
        Observe the next states $s_i^{t+1}$, e.g., $s_i^{t+1} = [H_i^{t+1}, G_i^{t+1}]$
        according to the channel model
        Store the tuples $[s_i^t, a_i^t, r_i^t, s_i^{t+1}]$ in replay buffer $\mathcal{D}$
        For all agents, set $s_i^t \leftarrow s_i^{t+1}$
        for agent i = 1: N do
            Sample a random mini-batch of K samples $[s_i^k, a_i^k, r_i^k, s_i^{k+1}]$ from buffer replay $\mathcal{D}$
            Compute the loss between the target values $Y_{\theta_i}^t$ and on-line values $Q_{\theta_i}^i(s^t, a_i^t)$
            Compute the gradients of the loss function $\nabla_{\theta_i} L_i(\theta_i)$
            Update the critic networks $Q_{\theta_i}^i(s^t, a_i)$ according to equation 8
            Compute gradient $$\nabla_{\phi_i} J_i(\mu_{\phi_i}^i) = \nabla_{\phi_i} \mu_{\phi_i}^i(s_i) \nabla_{a_i} Q_{\theta_i}^i(s, a_i)\big|_{s_i = s_i^t, a_i = \mu_{\phi_i}^i(s_i^t)}$$

Update the actor networks $\mu_{\phi_i}^i(s_i)$ according to equation 9
        end for
    end for
end for

---

FIG. 4 shows an exemplary signaling diagram, which may be used in the context of the scenario of FIG. 3. The local side may be representative of radio nodes and/or associated ANNs (actors) or agents, or circuitry for running those. The central side may represent the circuitry and/or system running the critic/s and/or a copy of the actors, e.g. a centralised circuitry. In an optional action, the actor/s may be transmitted to the local side, e.g. to be run as agents. The agents may perform control of the radio nodes, and collect associated operation information, e.g. as batch of experience samples. The operation information may be provided from multiple agents and/or actors to the central side to be stored, e.g. via a communication links like a wireless connections, e.g. a radio access or backhaul, and/or cable connections. Different actors may be connected differently. The operation information may include activity information and/or radio environment information and/or a representation of the actor/ANN for each actor and/or agent. Based on the stored information, a learning or training process for the ANNs and/or associated critic networks may be performed. As a learning feedback, in the example shown, the trained ANN may be transferred to each agent; however, other forms of learning feedback may be considered, e.g. to save signaling overhead.

To overcome the issues of non-stationarity and partial observability, a proposed architecture includes model sharing for actors and critics in the training phase. That is, it may be provided that $$\mu_{\varphi_1}^1 = \mu_{\varphi_2}^2 = \ldots = \mu_{\varphi_N}^N,$$

$$Q_{\theta_1}^1 = Q_{\theta_2}^2 = \ldots = Q_{\theta_N}^N.$$

It may be considered that a set of N first neural networks (actors or ANN) are trained to map current partial states to actions in given action space (e.g. of available precoders) through interactions with an environment of a multi-antenna system. A set of N2 (N2 may be equal to N) second neural networks (critics) may be trained to take as input the actions of the first neural networks and the environmental states to produce action values as output. N pairs of first and second networks are represented by N agents where each agent consists of its actor and critic network to serve its desired user in multi-user environment. An agent and/or actor may control and/or operate and/or provide information (e.g., for a precoder) and/or comprise one or more network nodes and/or TRPs and/or cells. A user may be represented by a terminal or user equipment or wireless device.

Each agent may choose one or more actions based on partial observation $s_i$ of the entire state $S=[s_1, \ldots, s_N]$ by using its actor network. It may be considered that the environmental state $s_i$ is given by channel matrices. In some cases, channel matrices may correspond to MIMO channels, e.g. from where the agent is placed to users.

There may be generally considered neural networks and/or radio nodes and/or agents and/or centralised circuitry adapted to perform actions as described herein.

It may be considered that the set of output actions of the actor neural networks may be provided as input actions to the environment in order to receive a corresponding set of reward signals In some variants, output actions of the actor neural networks may be perturbed by adding random noise before being provided to the environment. The noise variance may vary over training time. It may be considered that the variance gets smaller with the number of training.

Output actions of the actor neural networks may be transformed in the form of a precoder vector or matrix for the MIMO transmission. The transformation may include a procedure for the precoder vector or matrix to have unit Frobenius-norm. The transformation may include a procedure for each element of a precoder vector or matrix to have unit-amplitude.

Reward signals (e.g., for training) may be given by and/or based on one or more of bit-error rate, channel capacity, and throughput, and/or the action values can be defined by and/or based on the reward signals.

It may be considered that the critic network/s are trained to optimize policy in a centralized way having access to all the information about the environmental state.

In some variants, e.g. in one (competitive) environment, each agent may train its own critic by using the actions of all the actors and its own reward.

It may be considered that the agents share the critic model parameters between each other.

It may be considered that, e.g. in one (cooperative) environment, a single critic network may be trained by using the actions and rewards of all the agents, and shared by all the agents.

In some variants, e.g. in one (cooperative) environment, each agent may train its own critic by using rewards of all the agents and its own action.

In general, the agents may share critic model parameters.

It may be considered that one or more agents may compute gradients of its/their actor/s with respect to the actor network parameters and/or may compute gradients of its critic with respect to the input actions.

It may be considered that each agent may combine its actor gradient with the gradient of its critic neural network and may use it to update the actor in the direction of improving reward.

A single critic network may be shared by all the agents, the single critic and the actors may be updated in one central hub, and/or the updated actor models may be transferred to local agents.

In may be considered that, e.g. in one (homogeneous) scenario, the agents may share the actor model parameters between each other.

In some variant, the trained actor neural networks may be used to predict optimal or optimised actions for given environmental state and provide it to the multi-cell multi-user multi-antenna system, e.g. controlling it accordingly.

Centralised circuitry may be represented by one or more computers and/or a cloud system. The centralised circuitry may represent a central side for learning, e.g. implementing the critic network/s and/or ANNs. Centralised circuitry may comprise processing circuitry and/or communication circuitry.

In some variants, communicating may be based on a numerology (which may, e.g., be represented by and/or correspond to and/or indicate a subcarrier spacing and/or symbol time length) and/or an SC-FDM based waveform (including a FDF-DFTS-FDM based waveform) or a single-carrier based waveform. Whether to use pulse-shaping or FDF on a SC-FDM or SC-based waveform may depend on the modulation scheme (e.g., MCS) used. Such waveforms may utilise a cyclic prefix and/or benefit particularly from the described approaches. Communicating may comprise and/or be based on beamforming, e.g. transmission beamforming and/or reception beamforming, respectively. It may be considered that a beam is produced by performing analog beamforming to provide the beam, e.g. a beam corresponding to a reference beam. Thus, signaling may be adapted, e.g. based on movement of the communication partner. A beam may for example be produced by performing analog beamforming to provide a beam corresponding to a reference beam. This allows efficient postprocessing of a digitally formed beam, without requiring changes to a digital beamforming chain and/or without requiring changes to a standard defining beam forming precoders. In general, a beam may be produced by hybrid beamforming, and/or by digital beamforming, e.g. based on a precoder. This facilitates easy processing of beams, and/or limits the number of power amplifiers/ADC/DCA required for antenna arrangements. It may be considered that a beam is produced by hybrid beamforming, e.g. by analog beamforming performed on a beam representation or beam formed based on digital beamforming. Monitoring and/or performing cell search may be based on reception beamforming, e.g. analog or digital or hybrid reception beamforming. The numerology may determine the length of a symbol time interval and/or the duration of a cyclic prefix. The approaches described herein are particularly suitable to SC-FDM, to ensure orthogonality, in particular subcarrier orthogonality, in corresponding systems, but may be used for other waveforms. Communicating may comprise utilising a waveform with cyclic prefix. The cyclic prefix may be based on a numerology, and may help keeping signaling orthogonal. Communicating may comprise, and/or be based on performing cell search, e.g. for a wireless device or terminal, or may comprise transmitting cell identifying signaling and/or a selection indication, based on which a radio node receiving the selection indication may select a signaling bandwidth from a set of signaling bandwidths for performing cell search.

A beam or beam pair may in general be targeted at one radio node, or a group of radio nodes and/or an area including one or more radio nodes. In many cases, a beam or beam pair may be receiver-specific (e.g., UE-specific), such that only one radio node is served per beam/beam pair. A beam pair switch or switch of received beam (e.g., by using a different reception beam) and/or transmission beam may be performed at a border of a transmission timing structure, e.g. a slot border, or within a slot, for example between symbols Some tuning of radio circuitry, e.g. for receiving and/or transmitting, may be performed. Beam pair switching may comprise switching from a second received beam to a first received beam, and/or from a second transmission beam to a first transmission beam. Switching may comprise inserting a guard period to cover retuning time; however, circuitry may be adapted to switch sufficiently quickly to essentially be instantaneous; this may in particular be the case when digital reception beamforming is used to switch reception beams for switching received beams.

A reference beam may be a beam comprising reference signaling, based on which for example a of beam signaling characteristics may be determined, e.g. measured and/or estimated. A signaling beam may comprise signaling like control signaling and/or data signaling and/or reference signaling. A reference beam may be transmitted by a source or transmitting radio node, in which case one or more beam signaling characteristics may be reported to it from a receiver, e.g. a wireless device. However, in some cases it may be received by the radio node from another radio node or wireless device. In this case, one or more beam signaling characteristics may be determined by the radio node. A signaling beam may be a transmission beam, or a reception beam. A set of signaling characteristics may comprise a plurality of subsets of beam signaling characteristics, each subset pertaining to a different reference beam. Thus, a reference beam may be associated to different beam signaling characteristics.

A beam signaling characteristic, respectively a set of such characteristics, may represent and/or indicate a signal strength and/or signal quality of a beam and/or a delay characteristic and/or be associated with received and/or measured signaling carried on a beam. Beam signaling characteristics and/or delay characteristics may in particular pertain to, and/or indicate, a number and/or list and/or order of beams with best (e.g., lowest mean delay and/or lowest spread/range) timing or delay spread, and/or of strongest and/or best quality beams, e.g. with associated delay spread. A beam signaling characteristic may be based on measurement/s performed on reference signaling carried on the reference beam it pertains to. The measurement/s may be performed by the radio node, or another node or wireless device. The use of reference signaling allows improved accuracy and/or gauging of the measurements. In some cases, a beam and/or beam pair may be represented by a beam identity indication, e.g. a beam or beam pair number. Such an indication may be represented by one or more signaling sequences (e.g., a specific reference signaling sequences or sequences), which may be transmitted on the beam and/or beam pair, and/or a signaling characteristic and/or a resource/s used (e.g., time/frequency and/or code) and/or a specific RNTI (e.g., used for scrambling a CRC for some messages or transmissions) and/or by information provided in signaling, e.g. control signaling and/or system signaling, on the beam and/or beam pair, e.g. encoded and/or provided in an information field or as information element in some form of message of signaling, e.g. DCI and/or MAC and/or RRC signaling.

A reference beam may in general be one of a set of reference beams, the second set of reference beams being associated to the set of signaling beams. The sets being associated may refer to at least one beam of the first set being associated and/or corresponding to the second set (or vice versa), e.g. being based on it, for example by having the same analog or digital beamforming parameters and/or precoder and/or the same shape before analog beamforming, and/or being a modified form thereof, e.g. by performing additional analog beamforming. The set of signaling beams may be referred to as a first set of beams, a set of corresponding reference beams may be referred to as second set of beams.

In some variants, a reference beam and/or reference beams and/or reference signaling may correspond to and/or carry random access signaling, e.g. a random access preamble. Such a reference beam or signaling may be transmitted by another radio node. The signaling may indicate which beam is used for transmitting. Alternatively, the reference beams may be beams receiving the random access signaling. Random access signaling may be used for initial connection to the radio node and/or a cell provided by the radio node, and/or for reconnection. Utilising random access signaling facilitates quick and early beam selection. The random access signaling may be on a random access channel, e.g. based on broadcast information provided by the radio node (the radio node performing the beam selection), e.g. with synchronisation signaling (e.g., SSB block and/or associated thereto). The reference signaling may correspond to synchronisation signaling, e.g. transmitted by the radio node in a plurality of beams. The characteristics may be reported on by a node receiving the synchronisation signaling, e.g. in a random access process, e.g. a msg3 for contention resolution, which may be transmitted on a physical uplink shared channel based on a resource allocation provided by the radio node.

In general, different beam pair may differ in at least one beam; for example, a beam pair using a first received beam and a first transmission beam may be considered to be different from a second beam pair using the first received beam and a second transmission beam. A transmission beam using no precoding and/or beamforming, for example using the natural antenna profile, may be considered as a special form of transmission beam of a transmission beam pair. A beam may be indicated to a radio node by a transmitter with a beam indication and/or a configuration, which for example may indicate beam parameters and/or time/frequency resources associated to the beam and/or a transmission mode and/or antenna profile and/or antenna port and/or precoder associated to the beam. Different beams may be provided with different content, for example different received beams may carry different signaling; however, there may be considered cases in which different beams carry the same signaling, for example the same data signaling and/or reference signaling. The beams may be transmitted by the same node and/or transmission point and/or antenna arrangement, or by different nodes and/or transmission points and/or antenna arrangements.

Communicating utilising a beam pair or a beam may comprise receiving signaling on a received beam (which may be a beam of a beam pair), and/or transmitting signaling on a beam, e.g. a beam of a beam pair. The following terms are to be interpreted from the point of view of the referred radio node: a received beam may be a beam carrying signaling received by the radio node (for reception, the radio node may use a reception beam, e.g. directed to the received beam, or be non-beamformed). A transmission beam may be a beam used by the radio node to transmit signaling. A beam pair may consist of a received beam and a transmission beam. The transmission beam and the received beam of a beam pair may be associated to each and/or correspond to each other, e.g. such that signaling on the received beam and signaling on a transmission beam travel essentially the same path (but in opposite directions), e.g. at least in a stationary or almost stationary condition. It should be noted that the terms "first" and "second" do not necessarily denote an order in time; a second signaling may be received and/or transmitted before, or in some cases simultaneous to, first signaling, or vice versa. The received beam and transmission beam of a beam pair may be on the same carrier or frequency range or bandwidth part, e.g. in a TDD operation; however, variants with FDD may be considered as well. Different beam pairs may operate on the same frequency ranges or carriers or bandwidth parts (e.g., such that transmission beams operate on the same frequency range or carriers or bandwidth part, and received beams on the same frequency range or carriers or bandwidth part (the transmission beam and received beams may be on the same or different ranges or carriers or BWPs). Communicating utilizing a first beam pair and/or first beam may be based on, and/or comprise, switching from the second beam pair or second beam to the first beam pair or first beam for communicating. The switching may be controlled by the network, for example a network node (which may be the source or transmitter of the received beam of the first beam pair and/or second beam pair, or be associated thereto, for example associated transmission points or nodes in dual connectivity). Such controlling may comprise transmitting control signaling, e.g. physical layer signaling and/or higher layer signaling. In some cases, the switching may be performed by the radio node without additional control signaling, for example based on measurements on signal quality and/or signal strength of beam pairs (e.g., of first and second received beams), in particular the first beam pair and/or the second beam pair. For example, it may be switched to the first beam pair (or first beam) if the signal quality or signal strength measured on the second beam pair (or second beam) is considered to be insufficient, and/or worse than corresponding measurements on the first beam pair indicate. Measurements performed on a beam pair (or beam) may in particular comprise measurements performed on a received beam of the beam pair. It may be considered that the timing indication may be determined before switching from the second beam pair to the first beam pair for communicating. Thus, the synchronization may be in place 8and/or the timing indication may be available for synchronising) when starting communication utilizing the first beam pair or first beam. However, in some cases the timing indication may be determined after switching to the first beam pair or first beam. This may be in particular useful if first signaling is expected to be received after the switching only, for example based on a periodicity or scheduled timing of suitable reference signaling on the first beam pair, e.g. first received beam.

In some variants, reference signaling may be and/or comprise CSI-RS, e.g. transmitted by the network node. In other variants, the reference signaling may be transmitted by a UE, e.g. to a network node or other UE, in which case it may comprise and/or be Sounding Reference Signaling. Other, e.g. new, forms of reference signaling may be considered and/or used. In general, a modulation symbol of reference signaling respectively a resource element carrying it may be associated to a cyclic prefix.

A system comprising one or more radio nodes as described herein, in particular a network node and a user equipment, is described. The system may be a wireless communication system, and/or provide and/or represent a radio access network.

Moreover, there may be generally considered a method of operating an information system, the method comprising providing information. Alternatively, or additionally, an information system adapted for providing information may be considered. Providing information may comprise providing information for, and/or to, a target system, which may comprise and/or be implemented as radio access network and/or a radio node, in particular a network node or user equipment or terminal. Providing information may comprise transferring and/or streaming and/or sending and/or passing on the information, and/or offering the information for such and/or for download, and/or triggering such providing, e.g. by triggering a different system or node to stream and/or transfer and/or send and/or pass on the information. The information system may comprise, and/or be connected or connectable to, a target, for example via one or more intermediate systems, e.g. a core network and/or internet and/or private or local network. Information may be provided utilising and/or via such intermediate system/s. Providing information may be for radio transmission and/or for transmission via an air interface and/or utilising a RAN or radio node as described herein. Connecting the information system to a target, and/or providing information, may be based on a target indication, and/or adaptive to a target indication. A target indication may indicate the target, and/or one or more parameters of transmission pertaining to the target and/or the paths or connections over which the information is provided to the target. Such parameter/s may in particular pertain to the air interface and/or radio access network and/or radio node and/or network node. Example parameters may indicate for example type and/or nature of the target, and/or transmission capacity (e.g., data rate) and/or latency and/or reliability and/or cost, respectively one or more estimates thereof. The target indication may be provided by the target, or determined by the information system, e.g. based on information received from the target and/or historical information, and/or be provided by a user, for example a user operating the target or a device in communication with the target, e.g. via the RAN and/or air interface. For example, a user may indicate on a user equipment communicating with the information system that information is to be provided via a RAN, e.g. by selecting from a selection provided by the information system, for example on a user application or user interface, which may be a web interface. An information system may comprise one or more information nodes. An information node may generally comprise processing circuitry and/or communication circuitry. In particular, an information system and/or an information node may be implemented as a computer and/or a computer arrangement, e.g. a host computer or host computer arrangement and/or server or server arrangement.

In some variants, an interaction server (e.g., web server) of the information system may provide a user interface, and based on user input may trigger transmitting and/or streaming information provision to the user (and/or the target) from another server, which may be connected or connectable to the interaction server and/or be part of the information system or be connected or connectable thereto. The information may be any kind of data, in particular data intended for a user of for use at a terminal, e.g. video data and/or audio data and/or location data and/or interactive data and/or game-related data and/or environmental data and/or technical data and/or traffic data and/or vehicular data and/or circumstantial data and/or operational data. The information provided by the information system may be mapped to, and/or mappable to, and/or be intended for mapping to, communication or data signaling and/or one or more data channels as described herein (which may be signaling or channel/s of an air interface and/or used within a RAN and/or for radio transmission). It may be considered that the information is formatted based on the target indication and/or target, e.g. regarding data amount and/or data rate and/or data structure and/or timing, which in particular may be pertaining to a mapping to communication or data signaling and/or a data channel. Mapping information to data signaling and/or data channel/s may be considered to refer to using the signaling/channel/s to carry the data, e.g. on higher layers of communication, with the signaling/channel/s underlying the transmission. A target indication generally may comprise different components, which may have different sources, and/or which may indicate different characteristics of the target and/or communication path/s thereto. A format of information may be specifically selected, e.g. from a set of different formats, for information to be transmitted on an air interface and/or by a RAN as described herein. This may be particularly pertinent since an air interface may be limited in terms of capacity and/or of predictability, and/or potentially be cost sensitive. The format may be selected to be adapted to the transmission indication, which may in particular indicate that a RAN or radio node as described herein is in the path (which may be the indicated and/or planned and/or expected path) of information between the target and the information system. A (communication) path of information may represent the interface/s (e.g., air and/or cable interfaces) and/or the intermediate system/s (if any), between the information system and/or the node providing or transferring the information, and the target, over which the information is, or is to be, passed on. A path may be (at least partly) undetermined when a target indication is provided, and/or the information is provided/transferred by the information system, e.g. if an internet is involved, which may comprise multiple, dynamically chosen paths. Information and/or a format used for information may be packet-based, and/or be mapped, and/or be mappable and/or be intended for mapping, to packets. Alternatively, or additionally, there may be considered a method for operating a target device comprising providing a target indicating to an information system. More alternatively, or additionally, a target device may be considered, the target device being adapted for providing a target indication to an information system. In another approach, there may be considered a target indication tool adapted for, and/or comprising an indication module for, providing a target indication to an information system. The target device may generally be a target as described above. A target indication tool may comprise, and/or be implemented as, software and/or application or app, and/or web interface or user interface, and/or may comprise one or more modules for implementing actions performed and/or controlled by the tool. The tool and/or target device may be adapted for, and/or the method may comprise, receiving a user input, based on which a target indicating may be determined and/or provided. Alternatively, or additionally, the tool and/or target device may be adapted for, and/or the method may comprise, receiving information and/or communication signaling carrying information, and/or operating on, and/or presenting (e.g., on a screen and/or as audio or as other form of indication), information. The information may be based on received information and/or communication signaling carrying information. Presenting information may comprise processing received information, e.g. decoding and/or transforming, in particular between different formats, and/or for hardware used for presenting. Operating on information may be independent of or without presenting, and/or proceed or succeed presenting, and/or may be without user interaction or even user reception, for example for automatic processes, or target devices without (e.g., regular) user interaction like MTC devices, of for automotive or transport or industrial use. The information or communication signaling may be expected and/or received based on the target indication. Presenting and/or operating on information may generally comprise one or more processing steps, in particular decoding and/or executing and/or interpreting and/or transforming information. Operating on information may generally comprise relaying and/or transmitting the information, e.g. on an air interface, which may include mapping the information onto signaling (such mapping may generally pertain to one or more layers, e.g. one or more layers of an air interface, e.g. RLC (Radio Link Control) layer and/or MAC layer and/or physical layer/s). The information may be imprinted (or mapped) on communication signaling based on the target indication, which may make it particularly suitable for use in a RAN (e.g., for a target device like a network node or in particular a UE or terminal). The tool may generally be adapted for use on a target device, like a UE or terminal. Generally, the tool may provide multiple functionalities, e.g. for providing and/or selecting the target indication, and/or presenting, e.g. video and/or audio, and/or operating on and/or storing received information. Providing a target indication may comprise transmitting or transferring the indication as signaling, and/or carried on signaling, in a RAN, for example if the target device is a UE, or the tool for a UE. It should be noted that such provided information may be transferred to the information system via one or more additionally communication interfaces and/or paths and/or connections. The target indication may be a higher-layer indication and/or the information provided by the information system may be higher-layer information, e.g. application layer or user-layer, in particular above radio layers like transport layer and physical layer. The target indication may be mapped on physical layer radio signaling, e.g. related to or on the user-plane, and/or the information may be mapped on physical layer radio communication signaling, e.g. related to or on the user-plane (in particular, in reverse communication directions). The described approaches allow a target indication to be provided, facilitating information to be provided in a specific format particularly suitable and/or adapted to efficiently use an air interface. A user input may for example represent a selection from a plurality of possible transmission modes or formats, and/or paths, e.g. in terms of data rate and/or packaging and/or size of information to be provided by the information system.

In general, a numerology and/or subcarrier spacing may indicate the bandwidth (in frequency domain) of a subcarrier of a carrier, and/or the number of subcarriers in a carrier and/or the numbering of the subcarriers in a carrier, and/or the symbol time length. Different numerologies may in particular be different in the bandwidth of a subcarrier. In some variants, all the subcarriers in a carrier have the same bandwidth associated to them. The numerology and/or subcarrier spacing may be different between carriers in particular regarding the subcarrier bandwidth. A symbol time length, and/or a time length of a timing structure pertaining to a carrier may be dependent on the carrier frequency, and/or the subcarrier spacing and/or the numerology. In particular, different numerologies may have different symbol time lengths, even on the same carrier.

Signaling may generally comprise one or more (e.g., modulation) symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

An antenna arrangement may comprise one or more antenna elements (radiating elements), which may be combined in antenna arrays. An antenna array or subarray may comprise one antenna element, or a plurality of antenna elements, which may be arranged e.g. two dimensionally (for example, a panel) or three dimensionally. It may be considered that each antenna array or subarray or element is separately controllable, respectively that different antenna arrays are controllable separately from each other. A single antenna element/radiator may be considered the smallest example of a subarray. Examples of antenna arrays comprise one or more multi-antenna panels or one or more individually controllable antenna elements. An antenna arrangement may comprise a plurality of antenna arrays. It may be considered that an antenna arrangement is associated to a (specific and/or single) radio node, e.g. a configuring or informing or scheduling radio node, e.g. to be controlled or controllable by the radio node. An antenna arrangement associated to a UE or terminal may be smaller (e.g., in size and/or number of antenna elements or arrays) than the antenna arrangement associated to a network node. Antenna elements of an antenna arrangement may be configurable for different arrays, e.g. to change the beamforming characteristics. In particular, antenna arrays may be formed by combining one or more independently or separately controllable antenna elements or subarrays. The beams may be provided by analog beamforming, or in some variants by digital beamforming, or by hybrid beamforming combing analog and digital beamforming. The informing radio nodes may be configured with the manner of beam transmission, e.g. by transmitting a corresponding indicator or indication, for example as beam identify indication. However, there may be considered cases in which the informing radio node/s are not configured with such information, and/or operate transparently, not knowing the way of beamforming used. An antenna arrangement may be considered separately controllable in regard to the phase and/or amplitude/power and/or gain of a signal feed to it for transmission, and/or separately controllable antenna arrangements may comprise an independent or separate transmit and/or receive unit and/or ADC (Analog-Digital-Converter, alternatively an ADC chain) or DCA (Digital-to-Analog Converter, alternatively a DCA chain) to convert digital control information into an analog antenna feed for the whole antenna arrangement (the ADC/DCA may be considered part of, and/or connected or connectable to, antenna circuitry) or vice versa. A scenario in which an ADC or DCA is controlled directly for beamforming may be considered an analog beamforming scenario; such controlling may be performed after encoding/decoding and7or after modulation symbols have been mapped to resource elements. This may be on the level of antenna arrangements using the same ADC/DCA, e.g. one antenna element or a group of antenna elements associated to the same ADC/DCA. Digital beamforming may correspond to a scenario in which processing for beamforming is provided before feeding signaling to the ADC/DCA, e.g. by using one or more precoder/s and/or by precoding information, for example before and/or when mapping modulation symbols to resource elements. Such a precoder for beamforming may provide weights, e.g. for amplitude and/or phase, and/or may be based on a (precoder) codebook, e.g. selected from a codebook. A precoder may pertain to one beam or more beams, e.g. defining the beam or beams. The codebook may be configured or configurable, and/or be predefined. DFT beamforming may be considered a form of digital beamforming, wherein a DFT procedure is used to form one or more beams. Hybrid forms of beamforming may be considered.

A beam may be defined by a spatial and/or angular and/or spatial angular distribution of radiation and/or a spatial angle (also referred to as solid angle) or spatial (solid) angle distribution into which radiation is transmitted (for transmission beamforming) or from which it is received (for reception beamforming). Reception beamforming may comprise only accepting signals coming in from a reception beam (e.g., using analog beamforming to not receive outside reception beam/s), and/or sorting out signals that do not come in in a reception beam, e.g. in digital postprocessing, e.g. digital beamforming. A beam may have a solid angle equal to or smaller than 4*pi sr (4*pi correspond to a beam covering all directions), in particular smaller than 2*pi, or pi, or pi/2, or pi/4 or pi/8 or pi/16. In particular for high frequencies, smaller beams may be used. Different beams may have different directions and/or sizes (e.g., solid angle and/or reach). A beam may have a main direction, which may be defined by a main lobe (e.g., center of the main lobe, e.g. pertaining to signal strength and/or solid angle, which may be averaged and/or weighted to determine the direction), and may have one or more sidelobes. A lobe may generally be defined to have a continuous or contiguous distribution of energy and/or power transmitted and/or received, e.g. bounded by one or more contiguous or contiguous regions of zero energy (or practically zero energy). A main lobe may comprise the lobe with the largest signal strength and/or energy and/or power content. However, sidelobes usually appear due to limitations of beamforming, some of which may carry signals with significant strength, and may cause multi-path effects. A sidelobe may generally have a different direction than a main lobe and/or other side lobes, however, due to reflections a sidelobe still may contribute to transmitted and/or received energy or power. A beam may be swept and/or switched over time, e.g., such that its (main) direction is changed, but its shape (angular/solid angle distribution) around the main direction is not changed, e.g. from the transmitter's views for a transmission beam, or the receiver's view for a reception beam, respectively. Sweeping may correspond to continuous or near continuous change of main direction (e.g., such that after each change, the main lobe from before the change covers at least partly the main lobe after the change, e.g. at least to 50 or 75 or 90 percent). Switching may correspond to switching direction non-continuously, e.g. such that after each change, the main lobe from before the change does not cover the main lobe after the change, e.g. at most to 50 or 25 or 10 percent.

Signal strength may be a representation of signal power and/or signal energy, e.g. as seen from a transmitting node or a receiving node. A beam with larger strength at transmission (e.g., according to the beamforming used) than another beam does may not necessarily have larger strength at the receiver, and vice versa, for example due to interference and/or obstruction and/or dispersion and/or absorption and/or reflection and/or attrition or other effects influencing a beam or the signaling it carries. Signal quality may in general be a representation of how well a signal may be received over noise and/or interference. A beam with better signal quality than another beam does not necessarily have a larger beam strength than the other beam. Signal quality may be represented for example by SIR, SNR, SINR, BER, BLER, SLNR, Energy per resource element over noise/interference or another corresponding quality measure. Signal quality and/or signal strength may pertain to, and/or may be measured with respect to, a beam, and/or specific signaling carried by the beam, e.g. reference signaling and/or a specific channel, e.g. a data channel or control channel. Signal strength may be represented by received signal strength, and/or relative signal strength, e.g. in comparison to a reference signal (strength).

A radio node may generally be considered a device or node adapted for wireless and/or radio (and/or millimeter wave) frequency communication, and/or for communication utilising an air interface, e.g. according to a communication standard.

A radio node may be a network node, or a user equipment or terminal. A network node may be any radio node of a wireless communication network, e.g. a base station and/or gNodeB (gNB) and/or eNodeB (eNB) and/or relay node and/or micro/nano/pico/femto node and/or transmission point (TP) and/or access point (AP) and/or other node, in particular for a RAN or other wireless communication network as described herein.

The terms user equipment (UE) and terminal may be considered to be interchangeable in the context of this disclosure. A wireless device, user equipment or terminal may represent an end device for communication utilising the wireless communication network, and/or be implemented as a user equipment according to a standard. Examples of user equipments may comprise a phone like a smartphone, a personal communication device, a mobile phone or terminal, a computer, in particular laptop, a sensor or machine with radio capability (and/or adapted for the air interface), in particular for MTC (Machine-Type-Communication, sometimes also referred to M2M, Machine-To-Machine), or a vehicle adapted for wireless communication. A user equipment or terminal may be mobile or stationary. A wireless device generally may comprise, and/or be implemented as, processing circuitry and/or radio circuitry, which may comprise one or more chips or sets of chips. The circuitry and/or circuitries may be packaged, e.g. in a chip housing, and/or may have one or more physical interfaces to interact with other circuitry and/or for power supply. Such a wireless device may be intended for use in a user equipment or terminal.

A radio node may generally comprise processing circuitry and/or radio circuitry. A radio node, in particular a network node, may in some cases comprise cable circuitry and/or communication circuitry, with which it may be connected or connectable to another radio node and/or a core network.

Circuitry may comprise integrated circuitry. Processing circuitry may comprise one or more processors and/or controllers (e.g., microcontrollers), and/or ASICs (Application Specific Integrated Circuitry) and/or FPGAs (Field Programmable Gate Array), or similar. It may be considered that processing circuitry comprises, and/or is (operatively) connected or connectable to one or more memories or memory arrangements. A memory arrangement may comprise one or more memories. A memory may be adapted to store digital information. Examples for memories comprise volatile and non-volatile memory, and/or Random Access Memory (RAM), and/or Read-Only-Memory (ROM), and/or magnetic and/or optical memory, and/or flash memory, and/or hard disk memory, and/or EPROM or EEPROM (Erasable Programmable ROM or Electrically Erasable Programmable ROM).

Radio circuitry may comprise one or more transmitters and/or receivers and/or transceivers (a transceiver may operate or be operable as transmitter and receiver, and/or may comprise joint or separated circuitry for receiving and transmitting, e.g. in one package or housing), and/or may comprise one or more amplifiers and/or oscillators and/or filters, and/or may comprise, and/or be connected or connectable to antenna circuitry and/or one or more antennas and/or antenna arrays. An antenna array may comprise one or more antennas, which may be arranged in a dimensional array, e.g. 2D or 3D array, and/or antenna panels. A remote radio head (RRH) may be considered as an example of an antenna array. However, in some variants, an RRH may be also be implemented as a network node, depending on the kind of circuitry and/or functionality implemented therein.

Communication circuitry may comprise radio circuitry and/or cable circuitry. Communication circuitry generally may comprise one or more interfaces, which may be air interface/s and/or cable interface/s and/or optical interface/s, e.g. laser-based. Interface/s may be in particular packet-based. Cable circuitry and/or a cable interfaces may comprise, and/or be connected or connectable to, one or more cables (e.g., optical fiber-based and/or wire-based), which may be directly or indirectly (e.g., via one or more intermediate systems and/or interfaces) be connected or connectable to a target, e.g. controlled by communication circuitry and/or processing circuitry.

Any one or all of the modules disclosed herein may be implemented in software and/or firmware and/or hardware. Different modules may be associated to different components of a radio node, e.g. different circuitries or different parts of a circuitry. It may be considered that a module is distributed over different components and/or circuitries. A program product as described herein may comprise the modules related to a device on which the program product is intended (e.g., a user equipment or network node) to be executed (the execution may be performed on, and/or controlled by the associated circuitry).

A wireless communication network may be or comprise a radio access network and/or a backhaul network (e.g. a relay or backhaul network or an IAB network), and/or a Radio Access Network (RAN) in particular according to a communication standard. A communication standard may in particular a standard according to 3GPP and/or 5G, e.g. according to NR or LTE, in particular LTE Evolution.

A wireless communication network may be and/or comprise a Radio Access Network (RAN), which may be and/or comprise any kind of cellular and/or wireless radio network, which may be connected or connectable to a core network. The approaches described herein are particularly suitable for a 5G network, e.g. LTE Evolution and/or NR (New Radio), respectively successors thereof. A RAN may comprise one or more network nodes, and/or one or more terminals, and/or one or more radio nodes. A network node may in particular be a radio node adapted for radio and/or wireless and/or cellular communication with one or more terminals. A terminal may be any device adapted for radio and/or wireless and/or cellular communication with or within a RAN, e.g. a user equipment (UE) or mobile phone or smartphone or computing device or vehicular communication device or device for machine-type-communication (MTC), etc. A terminal may be mobile, or in some cases stationary. A RAN or a wireless communication network may comprise at least one network node and a UE, or at least two radio nodes. There may be generally considered a wireless communication network or system, e.g. a RAN or RAN system, comprising at least one radio node, and/or at least one network node and at least one terminal.

There is generally considered a program product comprising instructions adapted for causing processing and/or control circuitry to carry out and/or control any method described herein, in particular when executed on the processing and/or control circuitry. Also, there is considered a carrier medium arrangement carrying and/or storing a program product as described herein.

A carrier medium arrangement may comprise one or more carrier media. Generally, a carrier medium may be accessible and/or readable and/or receivable by processing or control circuitry. Storing data and/or a program product and/or code may be seen as part of carrying data and/or a program product and/or code. A carrier medium generally may comprise a guiding/transporting medium and/or a storage medium. A guiding/transporting medium may be adapted to carry and/or carry and/or store signals, in particular electromagnetic signals and/or electrical signals and/or magnetic signals and/or optical signals. A carrier medium, in particular a guiding/transporting medium, may be adapted to guide such signals to carry them. A carrier medium, in particular a guiding/transporting medium, may comprise the electromagnetic field, e.g. radio waves or microwaves, and/or optically transmissive material, e.g. glass fiber, and/or cable. A storage medium may comprise at least one of a memory, which may be volatile or non-volatile, a buffer, a cache, an optical disc, magnetic memory, flash memory, etc.

Signaling may generally be considered to represent an electromagnetic wave structure (e.g., over a time interval and frequency interval), which is intended to convey information to at least one specific or generic (e.g., anyone who might pick up the signaling) target. A process of signaling may comprise transmitting the signaling. Transmitting signaling, in particular control signaling or communication signaling, e.g. comprising or representing acknowledgement signaling and/or resource requesting information, may comprise encoding and/or modulating. Encoding and/or modulating may comprise error detection coding and/or forward error correction encoding and/or scrambling. Receiving control signaling may comprise corresponding decoding and/or demodulation. Error detection coding may comprise, and/or be based on, parity or checksum approaches, e.g. CRC (Cyclic Redundancy Check). Forward error correction coding may comprise and/or be based on for example turbo coding and/or Reed-Muller coding, and/or polar coding and/or LDPC coding (Low Density Parity Check). The type of coding used may be based on the channel (e.g., physical channel) the coded signal is associated to. A code rate may represent the ratio of the number of information bits before encoding to the number of encoded bits after encoding, considering that encoding adds coding bits for error detection coding and forward error correction. Coded bits may refer to information bits (also called systematic bits) plus coding bits.

Communication signaling may comprise, and/or represent, and/or be implemented as, data signaling, and/or user plane signaling. Communication signaling may be associated to a data channel, e.g. a physical downlink channel or physical uplink channel or physical sidelink channel, in particular a PDSCH (Physical Downlink Shared Channel) or PSSCH (Physical Sidelink Shared Channel). Generally, a data channel may be a shared channel or a dedicated channel. Data signaling may be signaling associated to and/or on a data channel.

A carrier may generally represent a frequency range or band and/or pertain to a central frequency and an associated frequency interval. It may be considered that a carrier comprises a plurality of subcarriers. A carrier may have assigned to it a central frequency or center frequency interval, e.g. represented by one or more subcarriers (to each subcarrier there may be generally assigned a frequency bandwidth or interval). Different carriers may be non-overlapping, and/or may be neighboring in frequency domain.

It should be noted that the term "radio" in this disclosure may be considered to pertain to wireless communication in general, and may also include wireless communication utilising millimeter waves, in particular above one of the thresholds 10 GHz or 20 GHz or 50 GHz or 52 GHz or 52.6 GHz or 60 GHz or 72 GHz or 100 GHz or 114 GHz. Such communication may utilise one or more carriers, e.g. in FDD and/or carrier aggregation. Upper frequency boundaries may correspond to 300 GHz or 200 GHz or 120 GHz or any of the thresholds larger than the one representing the lower frequency boundary.

Receiving or transmitting on a cell or carrier may refer to receiving or transmitting utilizing a frequency (band) or spectrum associated to the cell or carrier. A cell may generally comprise and/or be defined by or for one or more carriers, in particular at least one carrier for UL communication/transmission (called UL carrier) and at least one carrier for DL communication/transmission (called DL carrier). It may be considered that a cell comprises different numbers of UL carriers and DL carriers. Alternatively, or additionally, a cell may comprise at least one carrier for UL communication/transmission and DL communication/transmission, e.g., in TDD-based approaches.

A channel (e.g., for data signaling or control signaling) may generally be a logical, transport or physical channel. A channel may comprise and/or be arranged on one or more carriers, in particular a plurality of subcarriers. A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have two component channels, one for each direction. Examples of channels comprise a channel for low latency and/or high reliability transmission, in particular a channel for Ultra-Reliable Low Latency Communication (URLLC), which may be for control and/or data. However, in some cases there is referred to a channel between devices and/or affecting signaling; this may refer to the sum of the effects affecting signaling traveling from a transmitter to a receiver.

It is believed that the advantages of the aspects and variants presented herein will be fully understood from the foregoing description, and it will be apparent that various changes may be made in the form, constructions and arrangement of the exemplary aspects thereof without departing from the scope of the concepts and aspects described herein or without sacrificing all of its advantageous effects. The aspects presented herein can be varied in many ways.

Some useful abbreviations comprise

ABBREVIATION EXPLANATION

ACK/NACK Acknowledgment/Negative Acknowledgement
ARQ Automatic Repeat reQuest
BER Bit Error Rate
BLER Block Error Rate
BPSK Binary Phase Shift Keying
BWP BandWidth Part
CAZAC Constant Amplitude Zero Cross Correlation
CB Code Block
CBG Code Block Group
CDM Code Division Multiplex
CM Cubic Metric
CORESET Control Resource Set
CQI Channel Quality Information
CRC Cyclic Redundancy Check
CRS Common reference signal
CSI Channel State Information
CSI-RS Channel state information reference signal
DAI Downlink Assignment Indicator
DCI Downlink Control Information
DFT Discrete Fourier Transform
DFTS-FDM DFT-spread-FDM
DM(-)RS Demodulation reference signal(ing)
eMBB enhanced Mobile BroadBand
FDD Frequency Division Duplex
FDE Frequency Domain Equalisation
FDF Frequency Domain Filtering
FDM Frequency Division Multiplex
HARQ Hybrid Automatic Repeat Request
IAB Integrated Access and Backhaul
IFFT Inverse Fast Fourier Transform
IR Impulse Response
ISI Inter Symbol Interference
MBB Mobile Broadband
MCS Modulation and Coding Scheme
MIMO Multiple-input-multiple-output
MRC Maximum-ratio combining
MRT Maximum-ratio transmission
MU-MIMO Multiuser multiple-input-multiple-output
OFDM/A Orthogonal Frequency Division Multiplex/Multiple Access
PAPR Peak to Average Power Ratio
PDCCH Physical Downlink Control Channel
PDSCH Physical Downlink Shared Channel
PRACH Physical Random Access CHannel
PRB Physical Resource Block
PUCCH Physical Uplink Control Channel
PUSCH Physical Uplink Shared Channel
(P)SCCH (Physical) Sidelink Control Channel
PSS Primary Synchronisation Signal(ing)
(P)SSCH (Physical) Sidelink Shared Channel
QAM Quadrature Amplitude Modulation
OCC Orthogonal Cover Code
QPSK Quadrature Phase Shift Keying
PSD Power Spectral Density
RAN Radio Access Network
RAT Radio Access Technology
RB Resource Block
RNTI Radio Network Temporary Identifier
RRC Radio Resource Control
RX Receiver, Reception, Reception-related/side
SA Scheduling Assignment
SC-FDE Single Carrier Frequency Domain Equalisation
SC-FDM/A Single Carrier Frequency Division Multiplex/Multiple Access
SCI Sidelink Control Information
SINR Signal-to-interference-plus-noise ratio
SIR Signal-to-interference ratio
SLNR Signal-to-Leakage-plus-Noise ratio
SNR Signal-to-noise-ratio
SR Scheduling Request
SRS Sounding Reference Signal(ing)
SSS Secondary Synchronisation Signal(ing)
SVD Singular-value decomposition
TB Transport Block
TDD Time Division Duplex
TDM Time Division Multiplex
TX Transmitter, Transmission, Transmission-related/side
UCI Uplink Control Information
UE User Equipment
URLLC Ultra Low Latency High Reliability Communication
VL-MIMO Very-large multiple-input-multiple-output
ZF Zero Forcing
ZP Zero-Power, e.g. muted CSI-RS symbol Abbreviations may be considered to follow 3GPP usage if applicable.

The invention claimed is:

1. A method of operating a beam-forming wireless communication system, the system comprising a plurality of radio nodes, an actor neural network being associated to each radio node, further to each actor neural network, there is associated a critic network, the method comprising:
training each actor neural network, for controlling at least one associated radio node, based on learning feedback provided by the associated critic network, the learning feedback being based on operation information provided by one or both of the actor neural network and the radio node associated thereto for the critic network.

2. The method according to claim 1, wherein the operation information comprises radio environment information.

3. The method according to claim 1, wherein the operation information comprises activity information.

4. The method according to claim 1, wherein the operation information provided by different actor neural networks comprises radio environment information pertaining to different parts of the radio environment.

5. The method according to claim 1, wherein the operation information comprises radio environment information, wherein the radio environment information is one or both represented and representable by channel matrix information.

6. The method according to claim 1, wherein the learning feedback is based on reward learning.

7. The method according to claim 1, wherein the critic network is associated to a plurality of actor neural networks.

8. The method according to claim 1, wherein the operation information is provided via one or both of a backhaul link and a cable connection.

9. A beam-forming wireless communication system, the system comprising:
a plurality of radio nodes, an actor neural network being associated to each radio node, further to each actor neural network, there is associated a critic network, the system being configured to train each actor neural network, for controlling at least one associated radio node, based on learning feedback provided by the associated critic network, the learning feedback being based on operation information provided by one or both of the actor neural network and the radio node associated thereto for the critic network.

10. A method of operating an actor neural network for a wireless communication system, the actor neural network being associated to at least one radio node, to the actor neural network, there is associated a critic network, the method comprising:
training the actor neural network, for controlling the at least one associated radio node, based on learning feedback provided by the associated critic network, the learning feedback being based on operation information by one or both of the actor neural network and the radio node associated thereto for the critic network.

11. The method according to claim 10, wherein the operation information comprises radio environment information.

12. The method according to claim 10, wherein the operation information comprises activity information.

13. The method according to claim 10, wherein the operation information provided by different actor neural networks comprises radio environment information pertaining to different parts of the radio environment.

14. The method according to claim 10, wherein the operation information comprises radio environment information, wherein the radio environment information is one or both represented and representable by channel matrix information.

15. The method according to claim 10, wherein the learning feedback is based on reward learning.

16. The method according to claim 10, wherein the critic network is associated to a plurality of actor neural networks.

17. An actor neural network for a wireless communication system, the actor neural network being associated to at least one radio node, to the actor neural network, there is associated a critic network, the actor neural network being trained for:
controlling the at least one associated radio node, based on learning feedback provided by its associated critic network, the learning feedback being based on operation information provided by one or both of the actor neural network and the radio node associated thereto for the critic network.

18. The actor neural network according to claim 17, wherein one or more actor neural networks are comprised in a wireless communication system comprising one or more actor neural networks, wherein each actor neural network is trained, for controlling at least one associated radio node, based on learning feedback provided by the associated critic network, the learning feedback being based on operation information provided by one or both of the actor neural network and the radio node associated thereto for the critic network.

19. The actor neural network according to claim 17, wherein the actor neural network is controlled or controllable by a network node for a wireless communication network, the actor neural network being trained, for controlling at least one associated radio node, based on learning feedback provided by the associated critic network, the learning feedback being based on operation information provided by one or both of the actor neural network and the radio node associated thereto for the critic network.

20. A non-transitory computer storage medium storing a computer program comprising instructions causing processing circuitry to one or both control and perform a method of operating a beam-forming wireless communication system, the system comprising a plurality of radio nodes, an actor neural network being associated to each radio node, further to each actor neural network, there is associated a critic network, the method comprising:
training each actor neural network, for controlling at least one associated radio node, based on learning feedback provided by the associated critic network, the learning feedback being based on operation information provided by one or both of the actor neural network and the radio node associated thereto for the critic network.

* * * * *